United States Patent [19]

Korver

[11] 4,347,532

[45] Aug. 31, 1982

[54] PICTURE DISPLAY DEVICE ARRANGED FOR DISPLAYING A MIXED PICTURE SIGNAL AS AN INTERLACED TELEVISION PICTURE

[75] Inventor: Jan A. C. Korver, Eindhoven, Netherlands

[73] Assignee: U.S. Philips Corporation, New York, N.Y.

[21] Appl. No.: 196,407

[22] Filed: Oct. 14, 1980

[30] Foreign Application Priority Data

Oct. 15, 1979 [NL] Netherlands .......................... 7907598
Apr. 25, 1980 [NL] Netherlands .......................... 8002410

[51] Int. Cl.³ ................................................ H04N 5/22
[52] U.S. Cl. ..................................... 358/183; 340/703
[58] Field of Search ................ 358/188, 183; 340/703, 340/721, 722, 723, 724, 728, 730

[56] References Cited

U.S. PATENT DOCUMENTS 3,944,993  3/1976  Dalke et al. .......................... 340/703
4,228,433  10/1980  Matsumoto .......................... 358/183

*Primary Examiner*—Richard Murray
*Attorney, Agent, or Firm*—Thomas A. Briody; William J. Streeter; Laurence A. Wright

[57] ABSTRACT

A picture display device arranged for displaying, as an interlaced television picture, a mixed picture signal on a picture display tube, this picture signal including a television signal produced in accordance with a television standard and a digitally generated picture and/or text information signal, received from, for example, a teletext decoding circuit. In order to eliminate an annoying "jitter" which occurs in a portion of the displayed picture in which the digitally generated picture and/or text information signal is also displayed, a signal is generated which substantially eliminates the interlace in the said portion of the picture.

17 Claims, 5 Drawing Figures ism standard and a digitally generated picture and/or text information signal, the display device comprising field and line deflection generator circuits for deflecting one or more electron beams when produced in said picture display tube.

BACKGROUND OF THE INVENTION

Picture display devices of such a type, having a picture screen on which a mixed picture signal can be displayed are known. By means thereof pictures can be displayed in which locally generated characters, drawing elements and similar items can be superimposed on a normal picture, for example a moving picture transmitted, for example, by a transmitter and received in a conventional manner. Such a signal can be generated by, for example, a teletext decoder in the display device.

It has been found that the picture jumps up and down very quickly at a transition in the vertical direction between the portion of the displayed picture which does not contain characters etc. and the portion which does contain characters etc. This phenomenon may be visible in a very annoying manner, especially when there is a large contrast in the region of the transition between the two portions. This is particularly the case for a horizontal straight line to be displayed. This "jitter" is caused by the fact that the character-containing picture consists of two equal fields, which are alternately displayed on the screen and which have a mutual difference in height of one line spacing. As a rule, this situation does not occur with a picture coming from a television transmitter, as the vertical resolution of a signal generated by a television camera is poorer than the vertical resolution of a signal generated by a digital character generator and as a horizontal straight line does, as a rule, not occur in the picture.

In the past, circuits for the elimination of the above-mentioned phenomenon were proposed which were provided at the character generator, for example a teletext decoder circuit, or in the portion in the television receiver in which the signal is processed prior to its application to the control electrode(s) of the display tube. This affects the brightness and the position of certain details of the picture to be displayed in the region of the transition to such an extent that the phenomenon becomes less visible. These circuits are, however, rather complicated.

It is an object of the invention to provide a picture display device with a reduced visibility of the jitter phenomenon and to this end, the picture display device according to the invention is characterized in that it further comprises a circuit for generating a signal for additionally deflecting the electron beam(s) in the vertical direction for substantially eliminating the interlace in a portion of the displayed picture in which also the digitally generated picture and/or text information signal is displayed.

SUMMARY OF THE INVENTION

The invention is based on the recognition of the fact that circuits which are provided to reduce the visibility of the jitter phenomenon and are added to the deflection portion of the picture display device may be of a simpler construction than circuits in the signal processing portion.

The measure according to the invention eliminates the source of the annoying phenomenon, namely the interlace, but this is realised only in a portion of the picture where the phenomenon occurs, and consequently, in dependence on the picture content. This introduces a slight reduction of the vertical resolution in that portion. It was found that this error is much less annoying for the viewer than the substantially eliminated jitter phenomenon. It does, namely, affect to a very small extent only the quality of the television picture on which characters etc, have been superimposed, while the remaining portion of the picture is not affected as the number of picture lines prescribed by the standard are still displayed.

The picture display device according to the invention may be characterised in that the additional deflection signal is of picture frequency and is such that the picture lines displayed on the picture display screen of the picture display tube substantially coincide and that the additional deflection signal is a current flowing through a field deflection coil, the amplitude and the direction of this current being such that the picture lines displayed on the picture display screen substantially coincide.

According to the invention, the picture display device may be characterized in that the additional current flows in one field period and does not flow in the next field period, and that the amplitude thereof substantially corresponds to the spacing between two adjacent lines of a picture.

Preferably, the picture display device in accordance with the invention is characterized in that the amplitude of the additional current substantially corresponds to half the spacing between two adjacent lines of a picture and that the direction thereof in one field period is opposite to the direction in the next field period.

A picture display device comprising a field deflection amplifier for generating a deflection current flowing through the field deflection coil may be characterized in that it further comprises a current source for generating the additional current, this source being connected to the field deflection amplifier and having substantially no influence on a negative feedback operative in this amplifier.

When the picture display device comprises a teletext decoding circuit for generating the picture and/or text information signal, then the arrangement according to the invention may be characterized in that the local picture and box blanking signal generated by the teletext decoding circuit is used as information about the presence of the picture and/or text information signal.

BRIEF DESCRIPTION OF THE DRAWINGS

The invention will now be further explained by way of non-limitative example with references to the accompanying drawings wherein.

DETAILED DESCRIPTION OF THE PREFERRED EMBODIMENTS

Figure 1:
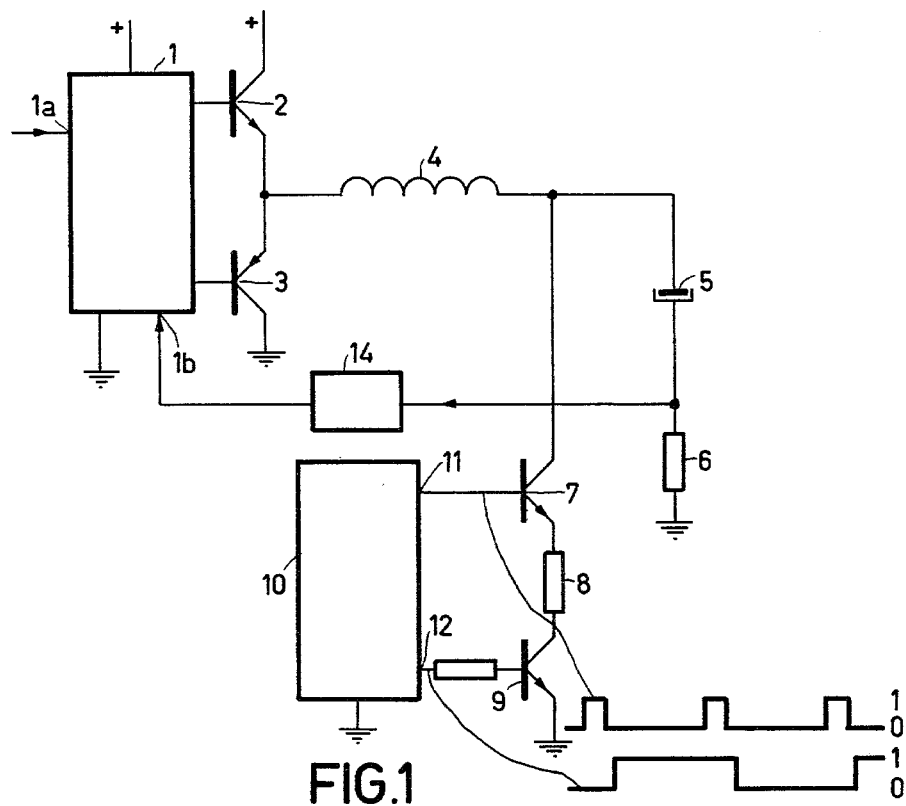
FIG. 1 shows a first embodiment of a circuit which forms part of a picture display device according to the invention.

In FIG. 1, reference numeral 1 denotes a field deflection amplifier of a known type to which two power transistors 2 and 3 are connected. A field deflection coil 4 for the vertical deflection of the electron beam(s) generated in a picture display tube, not shown, is connected to the interconnected emitters of transistors 2 and 3. The other side of coil 4 is connected to the series arrangement of a capacitor 5 and a negative feedback resistor 6.

In operation, a sawtooth-shaped deflection current of the field frequency, i.e. for example 50 Hz (European standard) flows through coil 4. The voltage across resistor 6 is negatively fed back via a negative feedback network 14 to an inverting input terminal 1b of amplifier 1 and is compared therein with a sawtooth input voltage which is received from a sawtooth generator and applied to a non-inverting input terminal 1a of amplifier 1, as a result of which the deflection current is of the same shape as the voltage at terminal 1a. When the picture display device, for example a television receiver, of which the circuit of FIG. 1 forms part is suitable for the display of a picture in accordance with a television standard, an interlaced picture then appears on the picture display screen. This is caused by the fact that the train of line synchronizing pulses of one field (half picture) is shifted half a line period with respect to the corresponding train of the next field.

For simplicity, a number of known elements have been omitted in FIG. 1 as they are not important for the invention. One of these elements is the centering circuit which ensures that a direct current flows through coil 4. So the total current flowing through coil 4 is a sawtooth current having a small, d.c. shift into the positive or the negative direction.

In accordance with the invention, the series arrangement of the collector-emitter path of a first npn transistor 7, a resistor 8 and the collector-emitter path of a second npn transistor 9 is connected to the junction point of elements 4 and 5. The emitter of transistor 9 and also that terminal of resistor 6 which is not connected to capacitor 5 are connected to ground.

The bases of transistors 7 and 9 are connected to a teletext decoding circuit 10 which receives and processes in known manner signals applied to it from the receiving portion, not shown, of the television receiver. A local picture and box blanking signal, which is applied to the base of transistor 7 is available at an output terminal 11 of the teletext decoding circuit, while a squarewave voltage having the picture frequency, i.e. 25 Hz, which is applied to the base of transistor 9, is present at an output terminal 12 of circuit 10.

FIG. 1 shows the signals at terminals 11 and 12. The signal at terminal 11 consists of a logic 0 during a portion of a field: in this portion no teletext information is applied to the control electrode(s) of the picture display tube and a television signal received by the television receiver need not be affected. At a determined instant the signal at terminal 11 becomes a logic 1, which implies that teletext information, for example a sub-title which may remain unchanged over a number of field periods, is applied to the said control electrode(s) while the brightness and/or contrast of the received television signal is limited. After a certain period of time the signal at the terminal 11 becomes a logic zero again. In these circumstances the picture on the display screen is a so-called mixed picture, that is to say it has a portion, at the top in this example, in which a normal television picture is displayed, and a portion, at the bottom in this example, in which a teletext information is displayed, below which a normal picture is displayed again. Visible on the boundary with the teletext information portion is a sharp brightness transition into the vertical direction which, without the measure according to the invention, would cause the above-mentioned annoying jitter phenomenon.

Transistors 7 and 9 conduct during the period of time the signals at terminals 11 and 12 are both logic 1, which is the case, as shown in FIG. 1, during one field and is not the case during the next field. So the transistors have an AND-function and a current having a frequency of 25 Hz flows through them, this current flowing either through transistor 2 or through transistor 3. This current also flows through deflection coil 4 and causes, as does also the centering current, a shift into the vertical direction of the horizontal lines displayed on the display screen, the difference being, however, that the shift is not done for the entire field but for a portion thereof. The value of resistor 8 is chosen such that this current causes a shift equal to the spacing between two adjacent lines. When the amplitude of the deflection current is, for example 3 A, which is the case for approximately 600 lines out of a total of 625 lines per picture (European standard), then the current must have an intensity of approximately 5 mA, which results in that resistor 8 has a value of some kilo-Ohms, depending on the value of the supply voltage, and that consequently the current is not determined by coil 4. So transistors 7 and 9 behave as a current source which has substantially no influence on the output voltage of the stage formed by transistors 2 and 3 and, consequently, hardly any influence on the current flowing through resistor 6, so that the negative feedback does not counteract the production of the additional current flowing through coil 4. Depending on the direction of the deflection current the additional current is substracted therefrom or added thereto.

During the occurrence of this current, for example during two lines of text, that is to say during 20 picture lines, the displayed lines of one field coincide with the lines of the next field, as these lines have not been shifted. The number of displayed lines in the relevant portion of the picture is indeed reduced to 50%, but the jitter has been almost completely eliminated there, so that the picture becomes quieter. The other portion of the picture, on the contrary, remains interlaced.

In FIG. 1, a current source is included in a parallel branch. It is obvious that the additional current can be introduced into the circuit in a different manner. A network may, for example, be provided in the negative feedback path between resistor 6 and terminal 1b, a square-wave voltage having a frequency of 25 Hz being superimposed on this network. An alternative possibility is the addition of a square-wave voltage having a frequency of 25 Hz, to the sawtooth voltage of the field frequency which is applied to terminal 1a. In the cases outlined above, the suitable waveform must first be generated by means of the signals at terminals 11 and 12 and an AND-gate.

In the foregoing, a determined number of lines of one field has been shifted into the vertical direction by one line spacing. For some pictures, for example pictures showing many transitions in the vertical direction, this shift may be too large. It may therefore be desirable to eliminate the interlace in such a way that the lines of a certain field are shifted half a line spacing downwards in the relevant portion of the picture to be displayed, while the lines of the other field are shifted half a line spacing upwards. This can be realised by means of the circuit shown in FIG. 2. In this FIG. 2, which shows the elements 1 through 6 of FIG. 1 the collector of a pnp transistor 7' and the collector of a npn transistor 9' are connected to the junction of coil 4 and capacitor 5. A resistor 8' is included between the emitter of transistor 7' and the positive supply line, while a resistor 8" is arranged between the emitter of transistor 9' and ground.

The bases of transistors 7' and 8' are supplied with the same switching signal which blocks both transistors during the field period, except for the portion in which the local field blanking signal at terminal 12 is a logic 1, in which portion the switching signal is for one field larger than the average value thereof and for the other field smaller. Such a signal can be generated by means of the signals at terminals 11 and 12 and is applied to the base of transistor 7' by means of a resistor 13' and to the base of transistor 9' by means of a resistor 13".

When the switching signal at the bases is larger than the average value, then transistor 9' conducts, while transistor 7' remains in the non-conductive state and when the switching signal is negative, smaller than the average value, transistor 7' conducts while transistor 9' remains in the non-conductive state. The alternately flowing collector currents flow through deflection coil 4, namely in opposite directions. So one collector current produces an upward shift on the display screen and the other collector current produces a downward shift. Resistors 8' and 8" have substantially the same values, i.e. the value at which a shift of half a line spacing occurs. For the same numerical values mentioned above the shift current has a value of 2.5 mA.

Figure 2:
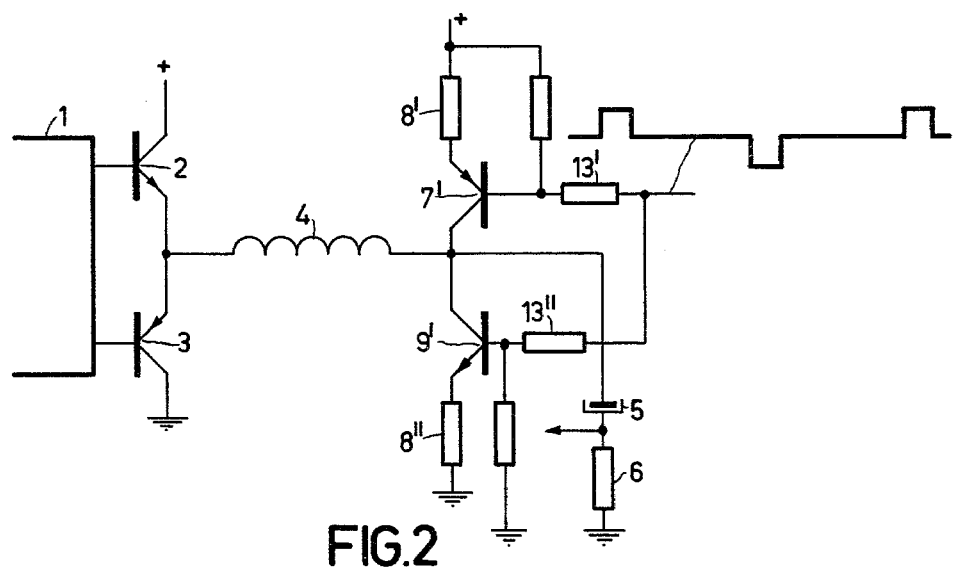
FIG. 2 shows a second embodiment thereof.
Figure 3:
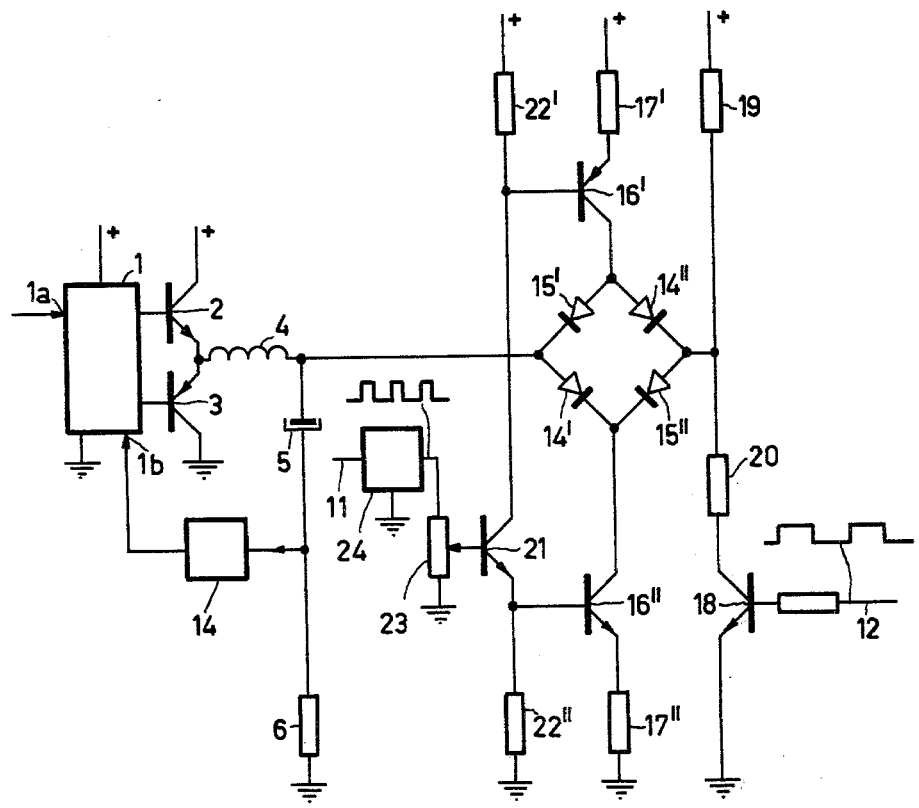
FIG. 3 shows a third preferred embodiment thereof.

With the circuit shown in FIG. 3 the same result can be obtained as with the circuit shown in FIG. 2. Elements 1 through 6 as well as network 14 are arranged as shown in FIGS. 1 and 2. The junction point of coil 4 and capacitor 5 is connected to the anode of a diode 14' and to the cathode of a diode 15'. The anode of diode 15' and the anode of a further diode 14" are connected to the collector of a pnp transistor 16', the emitter of which is connected to the positive supply voltage via a resistor 17'. In a similar manner the cathode of diode 14' and the cathode of a further diode 15" are connected to the collector of a npn transistor 16", the emitter of which is connected to ground via a resistor 17". Resistors 17' and 17" have substantially the same values.

The junction point of the cathode of diode 14" and the anode of diode 15" is connected to a resistor 19, whose other side is connected to the positive supply voltage, and to a resistor 20, whose other side is connected to the collector of a npn transistor 18. The emitter of transistor 18 is connected to ground. The base of transistor 16' is connected to the collector of an npn transistor 21 and the base of transistor 16" is connected to the emitter of transistor 21. The collector resistor 22' and the emitter resistor 22" of transistor 21 have substantially the same values.

The square-wave voltage of the picture frequency at terminal 12 is applied to the base of transistor 18. The local picture blanking signal of terminal 11 is applied to the base of transistor 21. In response to this last-mentioned signal, transistors 21, 16' and 16" are rendered conductive during a portion of the field period, while transistor 18 is non-conducting during one field period and conducting during the subsequent field period. When transistor 18 is in the non-conducting state while transistors 21, 16' and 16" conduct, the collector current of transistor 16" flows through resistor 19 and diode 15", while the collector current of transistor 16' flows through diode 15', coil 4 and transistor 2 or 3. The value of resistor 19 has been chosen such that the voltage at the collector of transistor 16" exceeds the voltage at the collector of transistor 16', so that diodes 14' and 14" are non-conducting.

During the corresponding portion of the subsequent field period transistors 16', 16", 18 and 21 conduct. Now the collector current of transistor 16' flows through diode 14" and transistor 18, while the collector current of transistor 16" flows through coil 4 and transistor 2 or 3. This causes diode 15' and 15" to be non-conducting. In the remaining portion of the period, in which transistors 21, 16' and 16" are non-conducting, no shift current is generated, irrespective of the conducting state of transistor 18. Superimposition of the displayed lines is adjusted by means of a potentiometer 23 which is included in the base lead of transistor 21.

Figure 4:
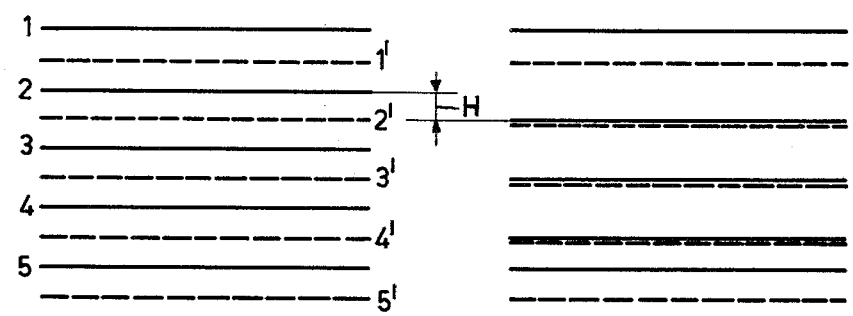
FIG. 4 shows schematically a portion of the displayed picture with and without the circuit of FIG. 1.
Figure 5:
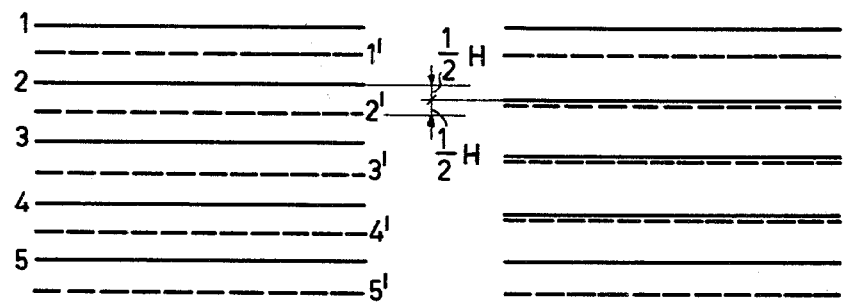
FIG. 5 shows the same as FIG. 4, but relates to the circuit of FIG. 2 or FIG. 3.

The left-hand Figure in FIG. 4 shows a portion of the original picture, while the right-hand Figure shows the result of the measure of FIG. 1. Herein, solid lines represent displayed lines of one field, while dotted lines represent displayed lines of the other field. In FIG. 4, the second, the third and the fourth solid lines are shifted downwards over a line distance H. The right-hand Figure in FIG. 5 shows the result of the measure of FIG. 2 or 3, the same solid lines having been shifted downwards, however now over half a line distance ½H, while the second, the third and the fourth dotted lines have been shifted upwards over the same distance. From these Figures it is apparent that a slight brightness error which is introduced by the measure according to the invention is the same for both transitions in the vertical direction in FIG. 5, which is in contrast with the situation in FIG. 4. In FIG. 4, the dark interspace after the first dotted line 1', has a width of 2 H, while the width of the light-coloured interspace after the fourth dotted line 4' is equal to H. In contrast therewith, the two corresponding interspaces in FIG. 5 have both a width of one and a half line spacing. Although this is purely theoretical, as the brightness impression for the eye will yet be somewhat different from what might be assumed from FIGS. 4 and 5, it will be apparent that the circuits of FIG. 2 or 3 should be preferred.

The measure according to the invention need not be limited to the elimination of the interlace for entire lines of text or even for entire picture lines, as characters may start in any place in a line. When an information about this is available, for example the local picture and box blanking signal in the case of teletext, then this information can be used to generate the shift current. However, a practical limitation for this is the fact that this current must be capable of varying with a high frequency, which may be difficult in view of the limited bandwidth of the deflection amplifier, inclusive of the deflection coil. One solution might be the use of an auxiliary deflection coil having a much lower inductance value than coil 4 or the use of an electrode of the picture display tube which is not supplied with a current but with a voltage.

The foregoing is, for example, applicable for the case of a text position which starts on the left on the display screen at some distance from the edge and ends on the right at some distance from the edge and which has a height of some picture lines. Such a text position, for example a sub-title, is superimposed on the picture transmitted by the transmitter. During this number of line periods the corresponding signal at terminal 11 is a square wave-signal of line frequency having a transition from logic 1 to logic 0 prior to the end of a line period and a transition from logic 0 to logic 1 after the beginning of the next line period. The above-mentioned difficulties as regards the high frequency can be reduced by applying a logic 1 to the base of transistor 7 and to the bases of transistors 7' and 9', respectively, or to the terminal, shown at top in the drawing, of potentiometer 23, also in the interval between the said transitions. This can be realised by means of a monostable multivibrator which is arranged between terminal 11 and the said bases and the said terminal, respectively, and which retains the voltage level from before the first transition to at least the second transition. In FIG. 3, block 24 represents such a multivibrator. By means of this measure the interlace is also eliminated on the left and on the right of the text position.

What is claimed is:

1. A picture display device having means for displaying as an interlaced television picture on a picture display tube, a mixed picture signal including a television signal produced in accordance with a television standard, a digitally generated picture, and a text information signal, comprising:
    means for generating field and line deflection signals for deflecting one or more electron beams when produced in said picture display tube, and
    means for generating a signal for additionally deflecting said electron beams in the vertical direction for substantially eliminating the interlace in a portion of said displayed picture in which said digitally generated picture and text information signals are displayed, said additional deflection signal having a picture frequency such that the picture lines displayed on said picture display screen of said picture display tube substantially coincide.

2. A picture display device as claimed in claim 1, comprising:
    a deflection coil connected to said field generating means and said additional deflection means whereby said means for generating an additional deflection signal provides a current flowing through said field deflection coil, the amplitude and direction of said current being such that the picture lines displayed on said picture display screen substantially coincide.

3. A picture display device as claimed in claim 2, wherein said additional current flows in one field period but does not flow in the next field period, and the amplitude of said additional current substantially corresponds to the spacing between two adjacent lines of a picture.

4. A picture display device as claimed in claim 3, further comprising:
    a first transistor,
    a second transistor, the collector-emitter paths of said first and second transistors being arranged in series, and
    first and second control signals, said first control signal rendering said first transistor conductive and being present in the period of time in which said digitally generated picture and said text information signals are also present, said second control signal of said second transistor during the period of said first control signal being a symmetrical square-wave signal of said picture frequency.

5. A picture display device as claimed in claim 2, wherein the amplitude of said additional current substantially corresponds to half the spacing between two adjacent lines of a picture and the direction of said additional current in one field period is opposite to the direction in the next field period.

6. A picture display device as claimed in claim 5 further comprising:
    a first and a second transistor, which are connected to said field deflection coil in such a manner that the collector currents thereof flow through said field deflection coil in the period of time in which the digitally generated picture and text information signals are also present and in such a way that in one field period the collector current of the first transistor flows in a first direction through said field deflection coil while in the next field period the collector current of the second transistor flows through said field deflection coil in the opposite direction.

7. A picture display device as claimed in claim 6, comprising:
    a control signal and wherein said first and second transistors are of the opposite conductivity type and said control signal renders said transistors conductive and is present in the period of time in which said digitally generated picture and said text information signal are also present and is in one field period larger than the average value thereof and is in the next field period smaller than said average value.

8. A picture display device as claimed in claim 6, comprising:
    a third transistor, the collector current of said first transistor flows through said third transistor during a field period in which it does not flow through said field deflection coil, the control signal of said first transistor being of the picture frequency and having a symmetrical square-wave form.

9. A picture display device as claimed in claim 8, comprising:
    a resistor, the collector current of said second transistor flowing through said resistor in a field period in which it does not flow through said field deflection coil.

10. A picture display device as claimed in claim 2, comprising:
    a field deflection amplifier for generating said deflection current flowing through said field deflection coil,
    a negative feedback network connected to said field deflection amplifier, and
    a current source for generating said additional current, said current source being connected to said field deflection amplifier and having substantially no influence on said negative feedback network operation on said amplifier.

11. A picture display device as claimed in claim 10, wherein said current source comprises a transistor which conducts at picture frequency and in the period of time in which said digitally generated picture and said text information signals are also present.

12. A picture display device as claimed in claim 11, in which the digitally generated picture and text information signals are present during a first portion of a line period and absent during a second portion thereof, wherein said transistor conducts during both portions of the line period considered.

13. A picture display device as claimed in claim 10, wherein a signal of picture frequency is added to the signal at an input terminal of said field deflection amplifier.

14. A picture display device as claimed in claim 1, wherein said additional deflection signal is a voltage applied to an electrode of said picture display tube.

15. A picture display device as claimed in claim 1, comprising:
a teletext decoding circuit for generating said digitally generated picture and text information signals, and wherein the local picture and box blanking signal generated by said teletext decoding circuit is used as information about the presence of said picture and text information signals.

16. A picture display device as claimed in claim 15 comprising:
a transistor and wherein, the terminal of said teletext decoding circuit for supplying the local picture and box blanking signal is coupled to the base of said transistor.

17. A picture display device as claimed in claim 16 comprising:
a memory element connected between said terminal and the base of said transistor.

* * * * *